(12) United States Patent
Chou

(10) Patent No.: US 8,248,510 B2
(45) Date of Patent: Aug. 21, 2012

(54) LENS AND CAMERA MODULE USING THE SAME

(75) Inventor: Meng-Chieh Chou, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 392 days.

(21) Appl. No.: 12/512,385

(22) Filed: Jul. 30, 2009

(65) Prior Publication Data

US 2010/0165171 A1 Jul. 1, 2010

(30) Foreign Application Priority Data

Dec. 25, 2008 (CN) .......................... 2008 1 0306538

(51) Int. Cl.
*G02B 13/16* (2006.01)
*H04N 5/225* (2006.01)

(52) U.S. Cl. ........................................................ 348/335

(58) Field of Classification Search ............ 348/240.99, 348/335, 374; 359/642
See application file for complete search history.

(56) References Cited

U.S. PATENT DOCUMENTS

| | | | | |
|---|---|---|---|---|
| 6,081,388 A | * | 6/2000 | Widl | 359/666 |
| 6,493,151 B2 | * | 12/2002 | Schachar | 359/666 |
| 2002/0118463 A1 | * | 8/2002 | Wu et al. | 359/639 |
| 2002/0118464 A1 | * | 8/2002 | Nishioka et al. | 359/642 |
| 2003/0189766 A1 | * | 10/2003 | Nishioka et al. | 359/726 |
| 2009/0021830 A1 | * | 1/2009 | Totzeck et al. | 359/499 |

FOREIGN PATENT DOCUMENTS

| | | |
|---|---|---|
| CN | 1704793 A | 12/2005 |
| CN | 1912672 A | 2/2007 |

* cited by examiner

*Primary Examiner* — Gevell Selby
(74) *Attorney, Agent, or Firm* — Altis Law Group, Inc.

(57) ABSTRACT

A lens is used in a camera module. The lens is made of piezoelectric material to miniaturize the size of the camera module.

10 Claims, 1 Drawing Sheet

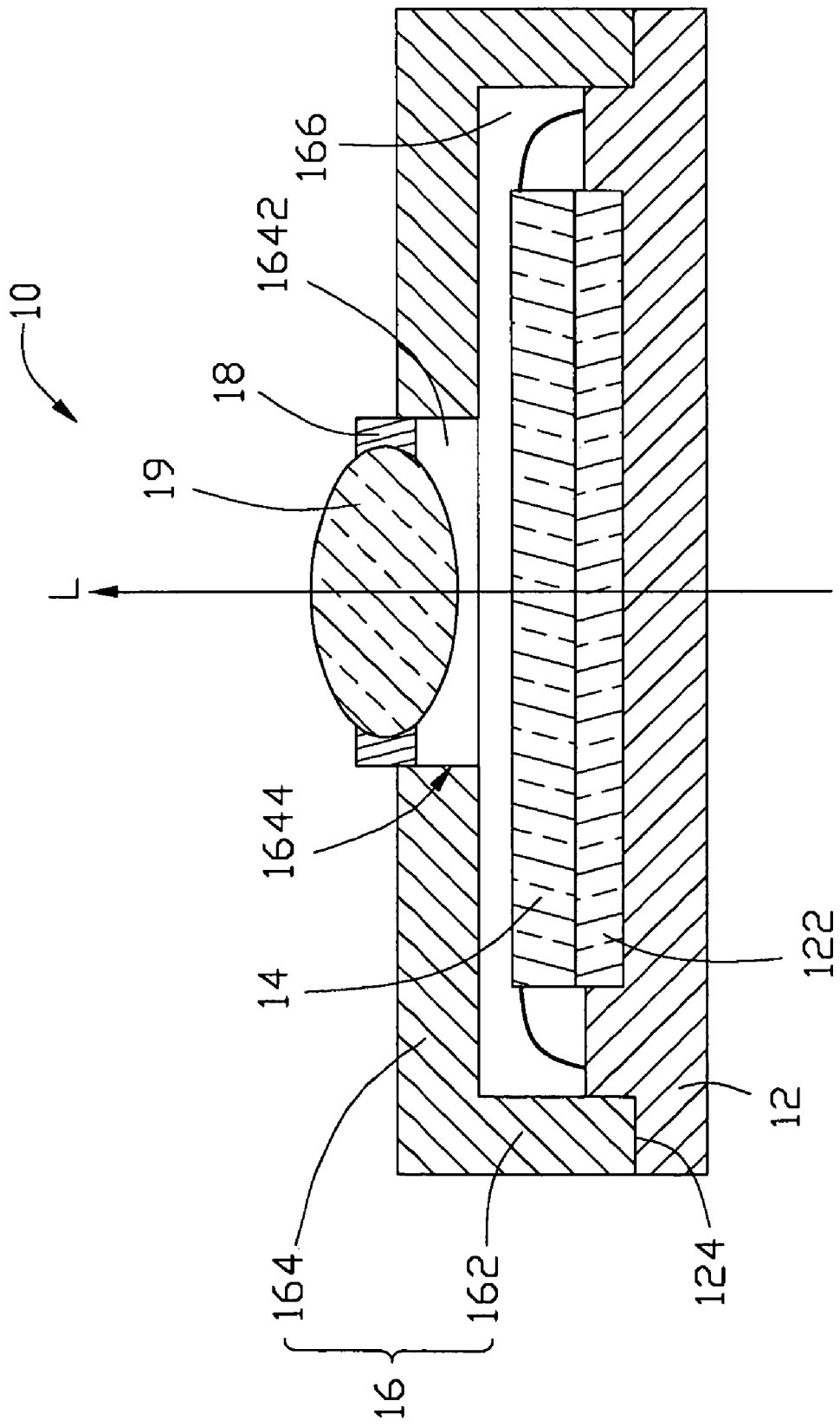

LENS AND CAMERA MODULE USING THE SAME

BACKGROUND

1. Technical Field

The exemplary disclosure generally relates to lenses, and particularly to lenses used in camera modules.

2. Description of Related Art

One kind of camera lens is disclosed in U.S. Pat. No. 4,291,958, the contents of which are hereby incorporated by reference thereto. The camera lens includes a fixed barrel, a movable barrel, two links, and two bender elements. The fixed barrel and the movable barrel each has a lens group therein and are coaxial. The bender elements are of cantilever fashion and are made of piezoelectric materials. One end of each bender element is fixed to an electric device and connected to a power supply. Another end of each bender element is connected to one link. The bender elements are approximately parallel to an axis of the two barrels. The links connect the bender elements and the movable barrel. In an original state (i.e. the when the power supply does not supply electricity), one bender element and one corresponding link forms an angle smaller than 90° therebetween. When the power supply supplies electricity to the bender elements, the bender elements deform under the effect of piezoelectricity. It results that the angle between the elements and the links changes, and the movable barrel thereby moves. Thus, the camera lens zooms or focuses.

However, the size of the bender elements and links are so large that the camera lens unit, as a whole, is fairly large. Therefore, digital cameras with such camera lens will be very large, and may be unattractive to consumers.

Thus, there is room for improvement within the art.

BRIEF DESCRIPTION OF THE DRAWING

Many aspects of the embodiments can be better understood with references to the following drawing. The components in the drawing are not necessarily drawn to scale, the emphasis instead being placed upon clearly illustrating the principles of the exemplary lens and camera module using the lens. Wherever possible, the same reference numbers are used throughout the drawing to refer to the same or like elements of an embodiment.

The drawing is an exploded view of an exemplary embodiment of a lens used in a portable electronic device, the camera module includes a substrate, a image sensor, a barrel, two electrode and a lens.

DETAILED DESCRIPTION

Referring to the drawing, an embodiment of a lens 19 used on a camera module 10 is shown. The camera module 10 includes a substrate 12, an image sensor 14 mounted to the substrate 12, a barrel 16 mounted to the substrate 12 surrounding the image sensor 14, two electrodes 18 mounted to the barrel 16 and the lens 19 held between the electrodes 18.

The substrate 12 has an adhesive 122 formed thereon and used for adhering the image sensor 14 to the substrate 12. The substrate 12 has a groove 124 defined in the peripheral wall thereof and configured to accommodate portions of the barrel 16.

The image sensor 14 is mounted on the substrate 12 by the adhesive 122. The image sensor 14 is electrically connected to a printed circuit board (PCB) (not shown), thereby allowing digital processing of the image data collected by the image sensor 14. The image sensor 14 may be charge coupled device (CCD) or complementary metal oxide semiconductor (CMOS)

The barrel 16 is hollow and includes a cylinder-shaped peripheral wall 162 and a base plate 164. The base plate 164 is connected with a distal end of the peripheral wall 162, so both of which together forms a cavity 166 for accommodating the image sensor 14. Another distal end of the peripheral wall 162 opposite to the base plate 164 is securely accommodated in the groove 124 of the substrate 12, therefore the barrel 16 and the substrate 12 are assembled together. The base plate 164 defines an opening 1642 in a center thereof, and two opposite sidewalls 1644 are formed in the opening 1642 facing each other. The electrodes 18 are respectively mounted on the sidewalls 1644.

The electrodes 18 may be made of indium tin oxide (ITO) and are electrically connected to the anode and the cathode of the power supply (not shown), respectively.

The lens 19 is held between the electrodes 18 in the opening 1642. The lens 19 is made of piezoelectric material. Perfectively, the lens 19 is made of crystalline quartz whose principle component is $SiO_2$, and has a refractivity of about 1.54 to 1.55 and a birefraction of about 0.0009.

In use, the power supply electrifies the electrodes 18 to form an electric field between the electrodes 18. At this time, the lens 19 deforms according to its piezoelectric characteristics, i.e., the lens 19 extends or compresses in the direction of optical axis L shown in FIG. 1. As such, a distance between the lens 19 and the image sensor 14 changes along the optical axis L, so a focus of the camera module 10 changes accordingly. The degree of deformation of the lens 19 varies depending on the supplied voltage from the power supply (not shown), which results in a change of the distance between the lens 19 and the image sensor 14. As such, the focus of the camera module 10 may change to a different length.

It is to be understood, however, that even though numerous characteristics and advantages of the exemplary disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A lens used in a camera module, wherein: the lens is made of piezoelectric material, the piezoelectric material is crystalline quartz whose principle component is $SiO_2$, the crystalline quartz has a refractivity of about 1.54 to 1.55.

2. The lens of claim 1, wherein the crystalline quartz has a birefraction of about 0.0009.

3. A camera module comprising:
a substrate;
a barrel mounted on the substrate and forming a cavity;
an image sensor mounted on the substrate and received in the cavity
a lens, the lens accommodated in the barrel, and the lens being made of piezoelectric material;
two electrodes, the two electrodes being mounted on two opposite sides of the lens;
wherein the piezoelectric material is crystalline quartz whose principle component is $SiO_2$, the crystalline quartz has a refractivity of about 1.54 to 1.55.

4. The camera module of claim 3, wherein the crystalline quartz has a birefraction of about 0.0009.

5. The camera module of claim 3, wherein the electrodes are made of Indium Tin Oxide.

6. The camera module of claim 3, wherein an electrical field is formed between the electrodes.

7. A camera module comprising:
- a substrate;
- a lens having an optical axis;
- a barrel mounted on the substrate and forming a cavity, the barrel defining an opening in the optical axis of the lens, and two semicircular portions are formed in the opening and each semicircular portion located at one side of the optical axis;
- an image sensor mounted on the substrate and received in the cavity;
- two electrodes, each electrode being mounted on one of the semicircular portions so each electrode is located at one side of the optical axis;
- wherein the lens is held between the electrodes in the opening, and the lens being made of piezoelectric material; the piezoelectric material is crystalline quartz whose principle component is $SiO_2$, the crystalline quartz has a refractivity of about 1.54 to 1.55.

8. The camera module of claim 7, wherein the crystalline quartz has a birefraction of about 0.0009.

9. The camera module of claim 7, wherein the electrodes are made of Indium Tin Oxide.

10. The camera module of claim 7, wherein an electrical field is formed between the electrodes.

* * * * *